: 5,751,521
: May 12, 1998

[54] DIFFERENTIAL SPIN VALVE SENSOR STRUCTURE

[75] Inventor: Hardayal Singh Gill, Portola Valley, Calif.

[73] Assignee: International Business Machines Corporation, Armonk, N.Y.

[21] Appl. No.: 710,804

[22] Filed: Sep. 23, 1996

[51] Int. Cl.⁶ .................................................. G11B 5/39
[52] U.S. Cl. .................................................. 360/113
[58] Field of Search .................. 360/113; 338/32 R; 324/252

[56] References Cited

U.S. PATENT DOCUMENTS

| | | | |
|---|---|---|---|
| 5,408,377 | 4/1995 | Gurney et al. | 360/113 |
| 5,442,508 | 8/1995 | Smith | 360/113 |
| 5,576,915 | 11/1996 | Akiyama et al. | 360/113 |
| 5,583,725 | 12/1996 | Coffey et al. | 360/113 |

*Primary Examiner*—Robert S. Tupper
*Attorney, Agent, or Firm*—Baker Maxham Jester & Meador

[57] ABSTRACT

A spin valve sensor structure for a magnetic read head is provided which employs first and second spin valve sensors separated by an insulative gap layer. Each spin valve sensor has a spacer layer sandwiched between a pinned layer and a laminated free layer. The magnetic orientations of the pinned layers are pinned in the same direction by first and second antiferromagnetic layers. The first laminated free layer includes a very thin ruthenium (Ru) layer sandwiched between first and second ferromagnetic free layers and the second laminated free layer includes a second very thin ruthenium (Ru) layer sandwiched between third and fourth ferromagnetic free layers. The second ferromagnetic free layer is thicker than the first ferromagnetic free layer and the third ferromagnetic free layer is thicker than the fourth ferromagnetic free layer. Upon the application of a magnetic field, the magnetic moments of the second and third ferromagnetic free layers rotate and the magnetic moments of the first and fourth ferromagnetic free layers follow due to strong exchange coupling. A first spacer layer is sandwiched between the first pinned layer and the second ferromagnetic free layer so that these layers produce a spin valve effect, and the second spacer layer is sandwiched between the second pinned layer and the fourth ferromagnetic free layer so that these layers produce a spin valve effect. Since the magnetic moments of the second and fourth ferromagnetic free layers are antiparallel, their rotations, relative to the direction of the magnetic moments of the pinned layer, produce responses of opposite polarity when excited by a magnetic field of one polarity. The opposite polarity responses are fed to a differential amplifier where they are combined for enhanced signal output and common mode noise rejection.

16 Claims, 4 Drawing Sheets

DIFFERENTIAL SPIN VALVE SENSOR STRUCTURE

BACKGROUND OF THE INVENTION

1. Field of the Invention

The present invention relates to a differential spin valve sensor structure and more particularly to a playback head which employs a pair of spin valves for differential detection and common mode rejection.

2. Description of the Related Art

A spin valve sensor is employed by a read head for sensing magnetic fields from moving magnetic media, such as a magnetic disk or a magnetic tape. Such a sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned 90° to the magnetization of the free layer and the magnetization of the free layer is free to respond to external magnetic fields. The magnetization of the pinned layer is typically pinned by exchange coupling with an antiferromagnetic layer. The thickness of the spacer layer is chosen to be less than the mean free path of conduction electrons through the sensor. With this arrangement, a portion of the conduction electrons are scattered by the interfaces of the spacer layer with the pinned and free layers. When the magnetizations of the pinned and free layers are parallel with respect to one another, scattering is minimal; when the magnetizations of the pinned and free layers are antiparallel, scattering is maximized. Changes in scattering change the resistance of the spin valve sensor proportional to $\cos\theta$, where $\theta$ is the angle between the magnetizations of the pinned and free layers. A spin valve sensor has a significantly higher magnetoresistive (MR) coefficient than an anisotropic magnetoresistive (AMR) sensor. For this reason it is sometimes referred to as a giant magnetoresistive (GMR) sensor.

A read head employing a spin valve sensor (hereinafter a "spin valve read head") may be combined with an inductive write head to form a combined head. The combined head may have the structure of either a merged head, or a piggyback head. In a merged head a single layer serves as a shield for the read head and as a first pole piece for the write head. A piggyback head has a separate layer which serves as the first pole piece for the write head. In a magnetic disk drive an air bearing surface (ABS) of a combined head is supported adjacent a rotating disk to write information on or read information from the disk. Information is written to the rotating disk by magnetic fields which fringe across a gap between the first and second pole pieces of the write head. In a read mode the resistance of the spin valve sensor changes proportionally to the magnitudes of the magnetic fields from the rotating disk. When the sense current is conducted through the spin valve sensor, the resistance changes cause potential changes that are detected and processed as playback signals.

A scheme to increase the signal to noise ratio of a spin valve head is to employ first and second spin valve sensors which are differentially detected for common mode noise rejection. Each spin valve sensor includes a thin nonmagnetic conductive layer sandwiched between free and pinned layers. In order for this scheme to work, the pinned layers have to be pinned antiparallel with respect to one another. This requires that the antiferromagnetic layers, which pin the pinned layers, be constructed of different materials with different blocking temperatures. The antiferromagnetic layer with the highest blocking temperature is constructed first and then the antiferromagnetic layer with the lower blocking temperature is constructed so as not to change the magnetic orientation of the first constructed antiferromagnetic layer. Unfortunately, there are no presently known different materials with sufficiently different blocking temperatures to accomplish the foregoing scheme.

SUMMARY OF THE INVENTION

The present invention provides a spin valve structure employing first and second spin valve sensors that produce responses of opposite polarities in reaction to a magnetic field of a single polarity. The opposite polarity responses are processed by a differential amplifier for common mode rejection of noise and for producing an enhanced combined signal. The first and second spin valve sensors are magnetically separated by a gap layer. The first spin valve sensor is connected in series with first and second leads and the second spin valve sensor is connected in series with third and fourth leads. The second and fourth leads are electrically interconnected and the first and third leads are adapted for connection to the differential amplifier. The first spin valve sensor includes a first non-magnetic electrically conductive spacer layer which is sandwiched between a first laminated free layer and a first ferromagnetic pinned layer. The second spin valve sensor includes a second non-magnetic electrically conductive spacer layer which is sandwiched between a second laminated free layer and a second ferromagnetic pinned layer. Orientations of magnetic moments of the first and second pinned layers are pinned by first and second antiferromagnetic layers respectively parallel with respect to one another and perpendicular to an air bearing surface (ABS) of a read head that incorporates the spin valve structure.

The first laminated free layer includes a very thin first ruthenium (Ru) layer sandwiched between first and second ferromagnetic free layers and the second laminated free layer includes a very thin second ruthenium (Ru) layer sandwiched between third and fourth ferromagnetic free layers. Each of the first and second ruthenium layers are on the order of 4–10 Å thick so that the first and second free layers are strongly exchange coupled, with their magnetic moments antiparallel with respect to one another, and the third and fourth free layers are strongly exchange coupled, with their magnetic moments antiparallel with respect to one another respectively. The magnetic moments of the first, second, third and fourth ferromagnetic free layers are oriented parallel to the ABS. Accordingly, in the presence of a magnetic field, the magnetic moments of the first and second free layers rotate together and the magnetic moments of the third and fourth free layers rotate together. The second and third ferromagnetic free layers are thicker than the first and fourth ferromagnetic free layers, respectively, so that the magnetic moments of the second and third ferromagnetic free layers rotate in response to a magnetic field and the magnetic moments of the first and fourth ferromagnetic free layers follow along.

The first spacer layer is sandwiched between the first pinned layer and the second ferromagnetic free layer and the second spacer layer is sandwiched between the second pinned layer and the fourth ferromagnetic free layer so that in the presence of an applied magnetic field, a first spin valve effect occurs between the first pinned layer and the second ferromagnetic free layer of the first spin valve and a second spin valve effect occurs between the second pinned layer and the fourth ferromagnetic free layer of the second spin valve.

The first and third ferromagnetic free layers are beyond the mean free path of conduction electrons and do not contribute the spin valve effect. As stated hereinabove the orientations of the magnetic moments of the first and second pinned layers are parallel and perpendicular to the ABS. The orientations of the magnetic moments of the second and fourth ferromagnetic free layers are antiparallel to each other and parallel to the ABS. Accordingly, in the presence of a magnetic field, the magnetic moment of the second ferromagnetic free layer rotates in one direction relative to the magnetic moment of the first pinned layer, and the magnetic moment of the fourth ferromagnetic free layer rotates in an opposite direction relative to the magnetic moment of the second pinned layer. The result is that the first spin valve produces a response signal of one polarity and the second spin valve produces a response signal of an opposite polarity. The response signals are then processed by the differential amplifier for common mode rejection and for enhanced signal output. With the foregoing arrangement the first and second antiferromagnetic layers are of the same material with the same blocking temperatures. The first and second laminated free layers are fully described in a commonly assigned U.S. Pat. No. 5,408,377. The laminated free layer is commonly referred to as a "synthetic ferrimagnet" since it is a combination of layers with antiparallel magnetizations of unequal magnitude.

An object of the present invention is to provide a spin valve read head which employs first and second spin valve sensors for differential detection of an applied magnetic field.

Another object is to provide a spin valve read head which employs first and second spin valves which have first and second antiferromagnetic layers of substantially the same material with substantially the same blocking temperature.

A further object is to provide a spin valve sensor which provides common mode rejection and an enhanced signal output.

Still another object is to provide a spin valve read head which significantly improves the signal-to-noise ratio of a readback signal over prior art spin valve read heads.

Still a further object is to provide a spin valve read head capable of areal densities of 10 Gb/in$^2$ and higher.

Other objects and advantages of the present invention will become more apparent upon reading the following description taken together with the accompanying drawings.

DESCRIPTION OF THE PREFERRED EMBODIMENT

Figure 1:
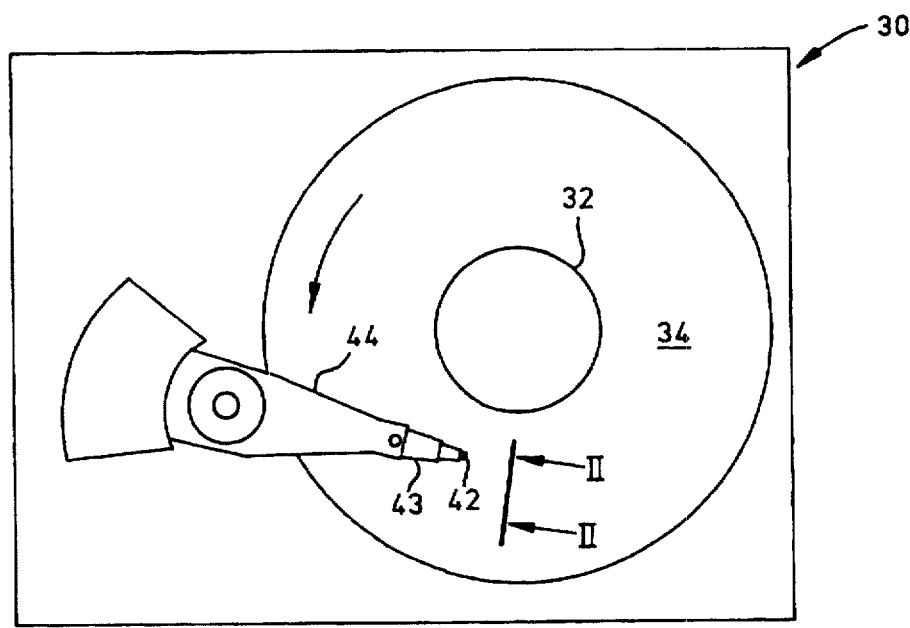
FIG. 1 is plan view of a magnetic disk drive.
Figure 2:
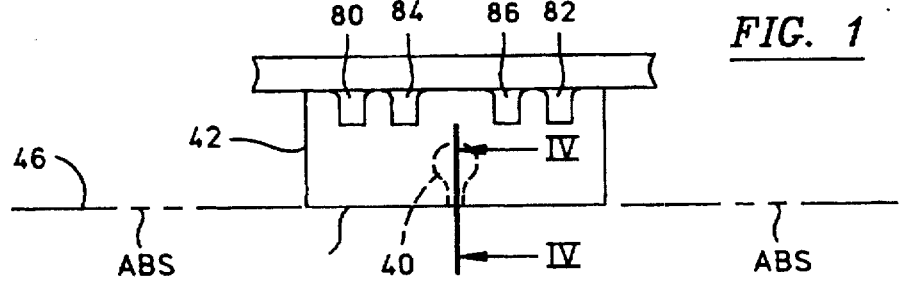
FIG. 2 is a view taken along plane II—II of FIG. 1.
Figure 3:
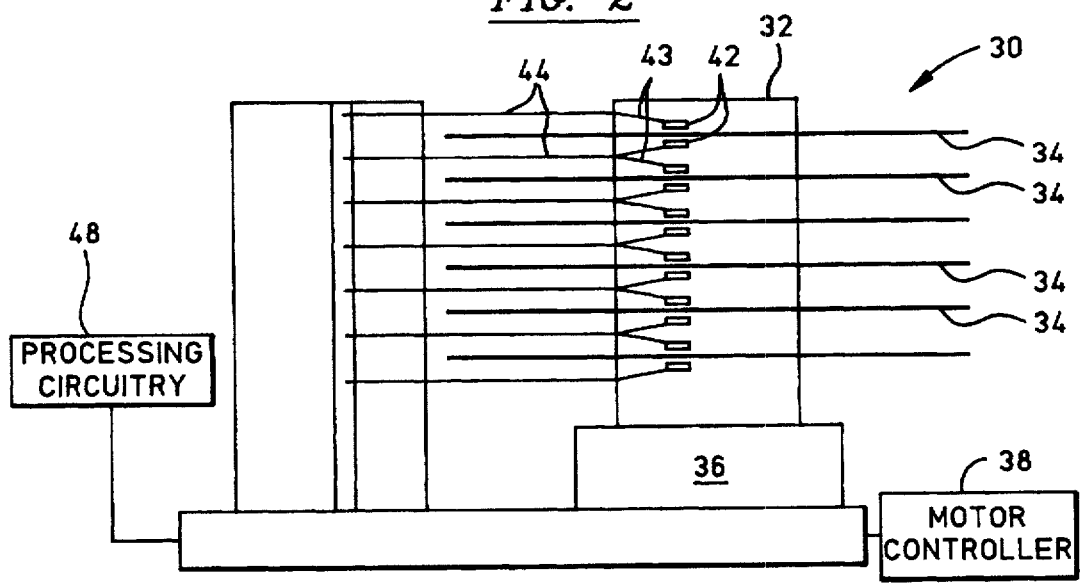
FIG. 3 is a side view of the magnetic disk drive of FIG. 1.

Referring now to the drawings wherein like reference numerals designate like or similar parts throughout the several views there is illustrated in FIGS. 1, 2 and 3 a magnetic disk drive 30. The drive 30 includes a spindle 32 which supports and rotates a magnetic disk 34. The spindle 32 is rotated by a motor 36 which, in turn, is controlled by motor controller 38. A magnetic head 40, which may be a merged MR head for recording and reading, is mounted on a slider 42 which, in turn, is supported by a suspension 43 and actuator arm 44. A plurality of disks, sliders and suspensions may be employed in a large capacity direct access storage device (DASD) as shown in FIG. 3. The suspension 43 and actuator arm 44 position the slider 42 to place the magnetic head 40 in a transducing relationship with a surface of the magnetic disk 34. When the disk 34 is rotated by the motor 36 the slider is supported on a thin (typically, 0.075 μm) cushion of air (air bearing) by an air bearing surface (ABS) 46.

The magnetic head 40 is then employed for writing information to multiple circular tracks on the surface of the disk as well as for reading information therefrom. Processing circuitry 48 exchanges signals representing said information with the head 40, provides motor drive signals, and provides control signals for moving the slider 42 to various tracks.

Figure 4:
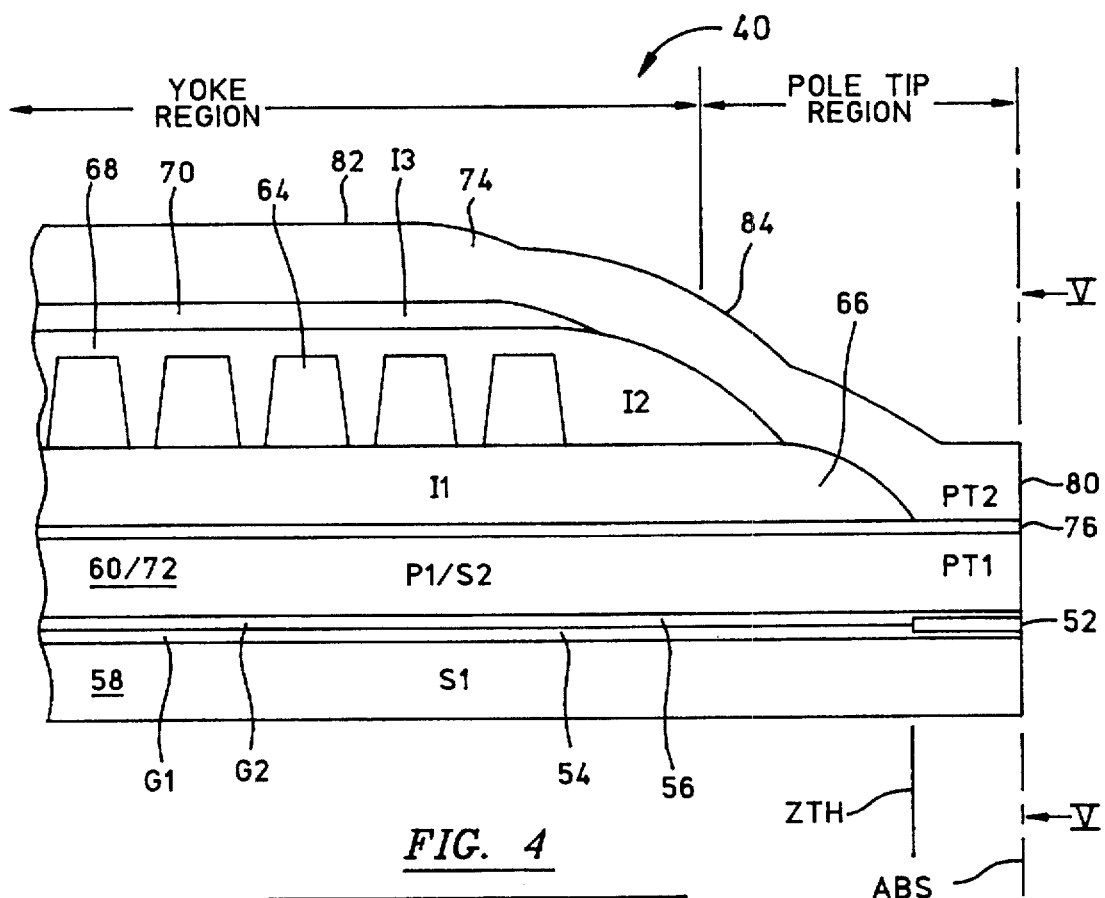
FIG. 4 is a view taken along plane IV—IV of FIG. 2.

FIG. 4 is a side cross-sectional elevation view of a merged MR head 50 which has a write head portion and a read head portion, the read head portion employing a sensor structure incorporating a dual spin valve MR sensor 52 according to the present invention. The MR sensor 52 is sandwiched between first and second gap layers 54 and 56, the first and second gap layers, in turn, being sandwiched between first and second shield layers 58 and 60. In response to external magnetic fields, the resistance of the MR sensor 52 changes. A sense current conducted through the sensor causes these changes to be manifested as potential changes. These potential changes are processed by the processing circuitry 48 shown in FIG. 3.

The write head portion of the head includes a coil layer 64 which is sandwiched between first and second insulation layers 66 and 68. A third insulation layer 70 may be employed for planarizing the head to eliminate ripples in the second insulation layer caused by the coil layer 64. The coil layer 64, and the first, second and third insulation layers 66, 68 and 70 are sandwiched between first and second pole piece layers 72 and 74. The first and second pole piece layers 72 and 74 are separated by a write gap layer 76 at the ABS and are magnetically coupled at a back gap (not shown) which is spaced from the ABS. As shown in FIG. 2 first and second solder connections 80 and 82 connect leads (not shown) from the MR sensor 52 to leads (not shown) on the suspension 43 and third and fourth solder connections 84 and 86 connect leads (not shown) from the coil 64 to leads (not shown) on the suspension.

Figure 7:
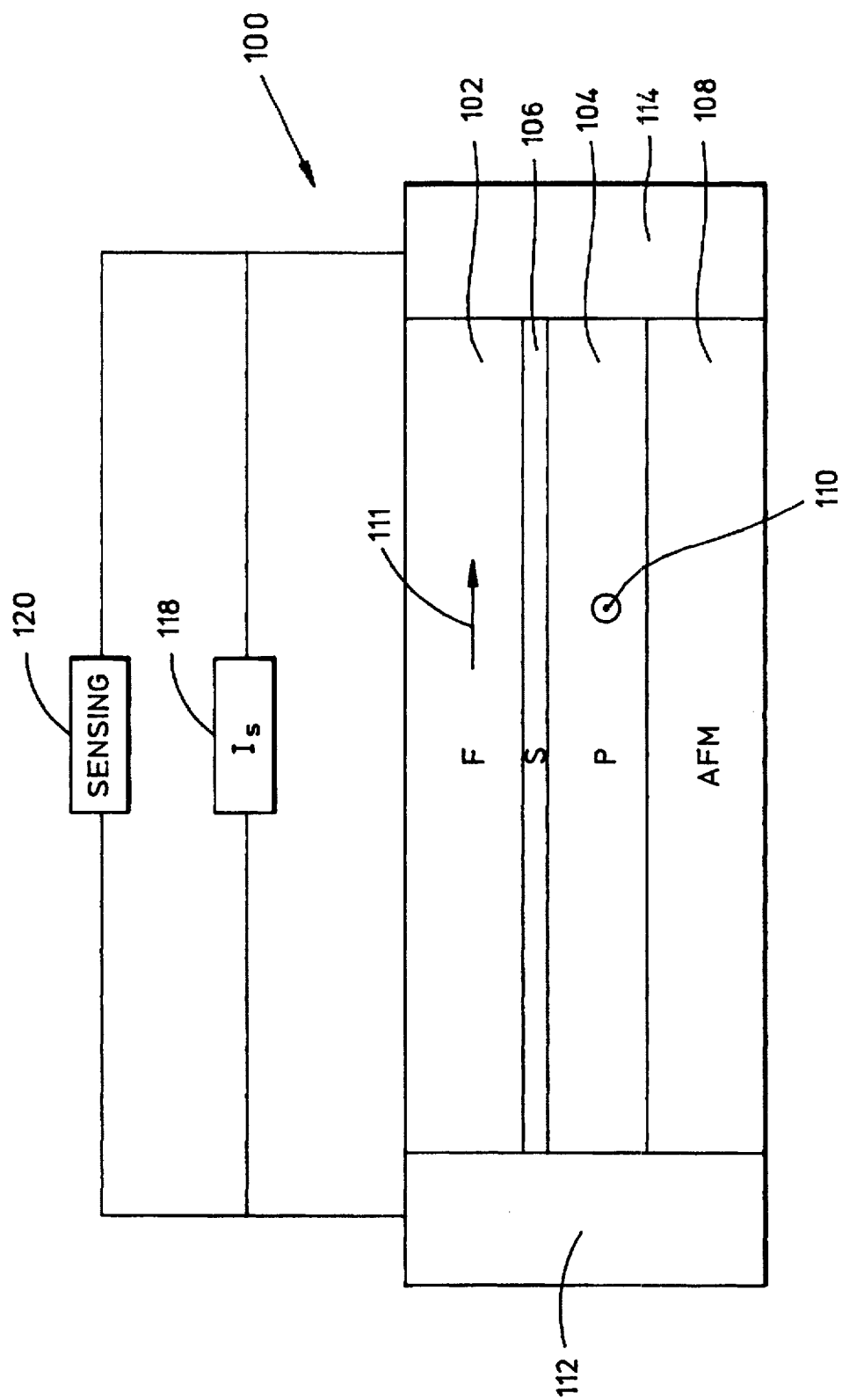
FIG. 7 shows a schematic ABS illustration of a prior art spin valve sensor.

FIG. 7 illustrates a prior art embodiment 100 of a magnetoresistive (MR) spin valve sensor which will be described as background for the present dual spin valve sensor 52 to be described hereinafter. The MR sensor 100 has first and second ferromagnetic layers which are a free layer 102 and a pinned layer 104. A nonmagnetic electrically-conducting spacer layer 106 is sandwiched between the free layer 102 and the pinned layer 104. An antiferromagnetic (AFM) layer 108 has a film surface which interfaces a film surface of the pinned layer 104 so that the magnetization 110 of the pinned layer 104 is pinned in a predetermined direction, such as perpendicular to the ABS, by exchange coupling with the antiferromagnetic layer 108. The free layer 102 has a magnetization 111 which is free to rotate under the influence of field signals from the rotating disk. The free and pinned layers 102 and 104 are typically made of Permalloy (NiFe) and the spacer layer 106 is typically made of copper. The antiferromagnetic layer 108 may be made of a material selected from the group of NiMn and FeMn. First and second leads 112 and 114 are electrically connected to the sensor 100 by any suitable means, such as contiguous junctions so that the space between the leads defines the track width of the read head. A sense current source 118 is electrically connected to the first and second leads 112 and 114 for providing a sense current ($I_s$) which is conducted through the spin valve sensor. In parallel with the sense current source 118 is a sensing circuit 120 for sensing potential changes across the spin valve sensor 100 when field signals are induced into the spin valve sensor by the rotating disk 34 shown in FIG. 1. The sense current source 118 and the sensing circuit 120 are part of the processing circuitry 48 in FIG. 3.

Each of the layers 102, 104, 106 and 108 conduct a portion of the sense current between the first and second leads 112 and 114. A key parameter in the operation of a spin valve sensor is that the spacer layer 106 have a thickness which is less than the mean free path of conduction electrons flowing between the first and second leads 112 and 114. The degree of electron scattering, which depends upon the relative angle between the magnetization 111 of the free layer 102 and the magnetization 110 of the pinned layer 104, determines the resistance of the MR sensor to the sense current $I_s$. The greatest scattering and the corresponding maximum resistance occurs when the magnetizations 110 and 111 are antiparallel and the least scattering and the corresponding least resistance occurs when the magnetizations 110 and 111 are parallel with respect to one another. The magnetization 111 of the free layer 102 is typically oriented parallel to the ABS so that upon receiving positive and negative field signals from a rotating disk the magnetization 111 rotates upwardly or downwardly to increase or decrease the resistance of the sensor. This would be an opposite situation if the magnetization 110 of the pinned layer 104 was oriented away from the ABS instead of toward the ABS.

Because of the thinness of the spacer layer 106 and the roughness at its interface with the pinned layer 104, there is a ferromagnetic coupling $H_{FC}$ which is induced on the free layer 102 by the pinned layer 104. Another field acting on the free layer 102 is a demagnetization field from the pinned layer 104 which causes an induced demagnetization field $H_{DEMAG}$ on the free layer. This is typically on the order of 51 Oe when the spin valve sensor is centered between the first and second shield layers 58 and 60 as shown in FIG. 4. By appropriately controlling the thicknesses of the layers 102, 104 and 106 and the amount of sense current $I_s$, the aforementioned fields can be made to substantially counter-balance one another so that the magnetic moment 111 of the free layer lies parallel to the ABS, as shown in FIG. 7, when the read head is in a quiescent state (sense current, but no applied signal).

The problem with the prior art spin valve sensor 100 in FIG. 7 is that noise picked up by the sensor is processed along with the signal. It would be desirable if this noise could be reduced or eliminated so as to increase the signal-to-noise ratio (SNR). If a pair of prior art sensors 100 could be properly employed, the noise could be eliminated by common mode noise rejection. The pair of prior art sensors would be required to produce signals of opposite polarities in response to a magnetic field of one polarity. The response signals would be processed by a differential amplifier in order to reject common mode noise, thereby increasing SNR. The pinned layers, one of which is shown at 104 in FIG. 7, would have to be pinned antiparallel with respect to one another. This would require that the antiferromagnetic layers, one of which is shown at 108 in FIG. 7, would have to be set with their magnetic orientations 180° out of phase with respect to each other.

During fabrication, the setting of the orientation of a magnetization is accomplished by applying a magnetic field to the layer in the desired direction during a heating phase. For instance, if the antiferromagnetic layer is FeMn its magnetic orientation would be established during fabrication by heating the layer to 200° C. while it is subjected to a magnetic field in the desired direction. The 200° level is referred to as the blocking temperature of FeMn. If the two antiferromagnetic layers were of the same material, it would be impossible to orient their magnetizations antiparallel with respect to one another. Both antiferromagnetic layers are subjected to the same temperature and the same magnetic field. Accordingly, it would be desirable if the antiferromagnetic layers had blocking temperatures which were sufficiently different so that the magnetic orientations of the layers could be established antiparallel with respect to one another. A pair of such antiferromagnetic layers with sufficiently different blocking temperatures is not presently known to exist. Accordingly, common mode noise rejection is a desirable feature for a spin valve read head but has not been achievable because of the lack of necessary materials for the antiferromagnetic layers.

Figure 5:
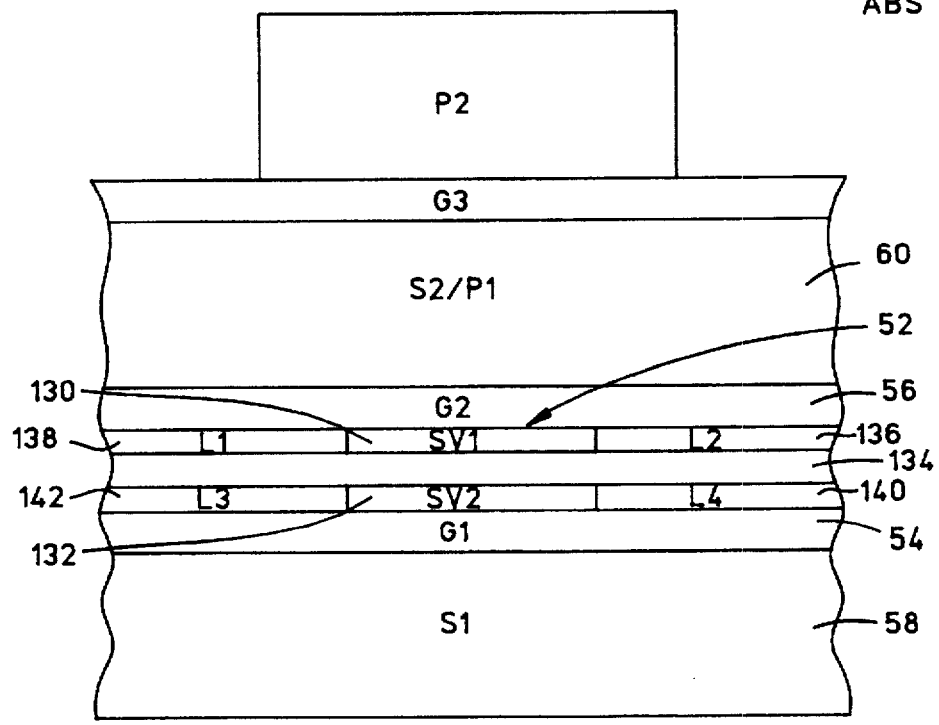
FIG. 5 is an ABS view of the read head of FIG. 4 taken along plane V—V of FIG. 4.
Figure 6:
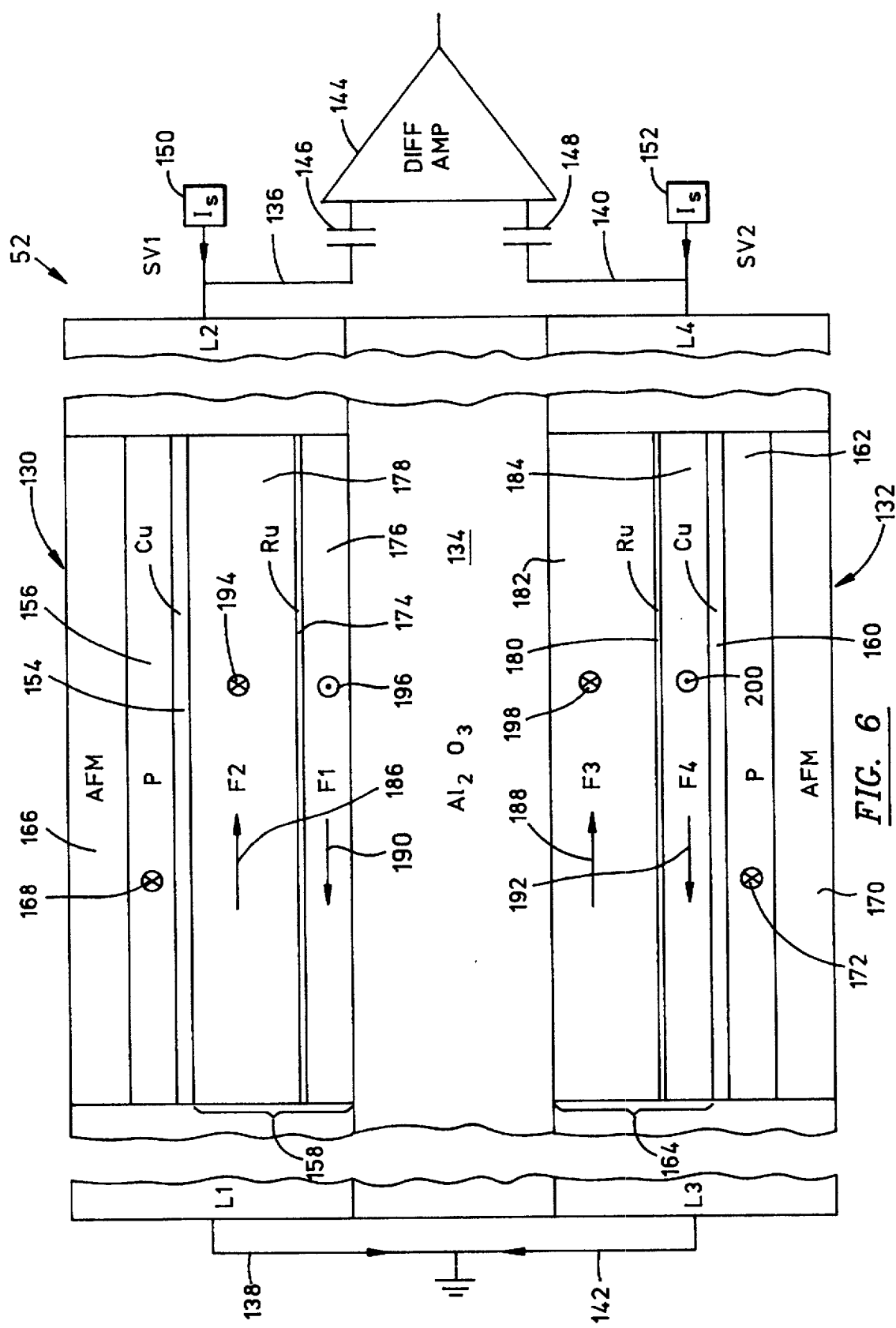
FIG. 6 is an enlarged schematic ABS illustration of the spin valve read head portion of FIG. 5.

As shown in FIGS. 4, 5 and 6, the present spin valve read head 52 employs first and second spin valve sensors 130 and 132 which are separated by a gap or insulation layer 134, such as $Al_2O_3$. As shown in FIG. 6, the first spin valve sensor 130 is connected in series with first and second leads 136 and 138, and the second spin valve sensor 132 is connected in series with third and fourth leads 140 and 142. The type of connections may be contiguous junctions, as shown in FIG. 6. The leads 138 and 142 may be interconnected to ground and the leads 136 and 140 may be connected across a differential amplifier 144 via first and second capacitors 146 and 148. First and second sense current sources 150 and 152 are connected to the second and fourth leads 136 and 140 respectively so that a sense current $I_s$ is conducted through each of the spin valve sensors 130 and 132 to ground. In a preferred embodiment, the sense currents $I_s$ are equal and the resistances of the first and second sensors 130 and 132 are equal in a quiescent state (no sense current). The spin valve sensors 130 and 132 are configured so as to produce response signals with opposite polarity so that the response signals can be differentially processed by the differential amplifier 144 to achieve common mode noise rejection. The differential amplifier 144 is part of the processing circuitry 48 shown in FIG. 3. The 180° out of phase response signals produced by the spin valve sensors 130 and 132 are added by the differential amplifier 144 while the common mode noise is cancelled.

The spin valve sensor 130 includes a first thin spacer layer 154 which is sandwiched between a pinned layer 156 and a laminated free layer 158. The spin valve sensor 132 includes a thin spacer layer 160 which is sandwiched between a pinned layer 162 and a laminated free layer 164. The spin valve sensor 130 further includes an antiferromagnetic layer (AFM) 166 which interfaces with the pinned layer 156 to pin its magnetic orientation into the paper by exchange coupling, as shown by the arrow 168. In a like manner, the spin valve sensor 132 includes an antiferromagnetic layer (AFM) 170 which interfaces with the pinned layer 162 to orient the magnetization of the pinned layer into the paper by exchange coupling, as shown by the arrow 172. In the present invention, the antiferromagnetic layers 166 and 170 are constructed of the same material, such as FeMn, with the same blocking temperature, so that the magnetic orientations 168 and 172 are parallel with respect to one another and preferably perpendicular to the ABS. Optionally, the magnetic orientations 168 and 172 could be directed out of the paper if desired. With this arrangement, the magnetic orientations of the antiferromagnetic layers 166 and 170 are established during fabrication by subjecting these layers to heat of 200° C. under a magnetic field which is directed out of the paper.

The laminated free layer 158 includes a very thin ruthenium (Ru) layer 174 which is sandwiched between first and second ferromagnetic free layers 176 and 178. The laminated free layer 164 includes a very thin ruthenium (Ru) layer 180 which is sandwiched between third and fourth ferromagnetic free layers 182 and 184. The ruthenium layers 174 and 180 have a thickness in the range of 4 Å to 10 Å. There is a strong exchange coupling between the first and second ferromagnetic free layers 176 and 178 and between the ferromagnetic free layers 182 and 184. It is important that the second ferromagnetic free layer 178 be thicker than the first ferromagnetic free layer 176 and that the third ferromagnetic free layer 182 be thicker than the fourth ferromagnetic free layer 184 for a purpose to be described hereinafter.

During fabrication the orientations of the magnetic moments of the second and third ferromagnetic free layers 178 and 182 are aligned parallel with respect to one another in the same direction parallel to the ABS, such as shown by the magnetic moments 186 and 188. Optionally, these magnetic moments could be aligned in an opposite direction. Since the second ferromagnetic free layer 178 is antiferromagnetically exchange coupled to the first ferromagnetic free layer 176, the magnetic moment 190 of the first ferromagnetic free layer 176 is antiparallel to the magnetic moment 186. In the same manner, since the third ferromagnetic free layer 182 is antiferromagnetically exchange coupled to the fourth ferromagnetic free layer 184, the magnetic moment 192 of the fourth ferromagnetic free layer is antiparallel to the magnetic moment 188 of the third ferromagnetic free layer. In a quiescent state of the read head 52, namely during sense current conduction but no applied signal, the magnetic orientations of the free layers are as shown at 186, 188, 190 and 192. Upon excitation by a field signal from a rotating disk, these magnetic moments will be rotated relative to the fixed magnetic moments 168 and 172 of the pinned layers 156 and 162. The spin valve effect for the first spin valve 130 occurs only between the relative rotation of the magnetic moment 186 of the second ferromagnetic free layer 178 and the magnetic moment 168 of the pinned layer 156. Since the first free layer 176 is located outside of the mean free path of the conduction electrons of the sense current, the rotation of its magnetic moment 190 has no influence upon the spin valve effect. In a like manner, it is the rotation of the magnetic moment 192 of the fourth ferromagnetic free layer 184 relative to the magnetic moment 172 of the pinned layer 162 which causes a spin valve effect for the spin valve sensor 132. In a like manner, since the third ferromagnetic free layer 182 is beyond the mean free path of the conduction electrons of the sense current, the rotation of its magnetic moment 188 has no influence upon the spin valve effect.

When encountering a magnetic field from a rotating disk, the thicker free layers 178 and 182 will rotate in the same direction. Since the thinner ferromagnetic free layers 176 and 184 are strongly exchange-coupled to the thicker layers 178 and 182, their magnetic moments 190 and 192 will follow the magnetic moments 186 and 188 respectively. The force of the exchange coupling between the thick and thin layer of each spin valve sensor is on the order of 10,000 Oe. F1 is rigidly antiparallel-coupled to F2 and similarly F3 is rigidly antiparallel-coupled to F4. These layers maintain antiparallel magnetization orientation while responding to magnetic fields. Assuming a magnetic field directed into the paper, the magnetic moment 186 of the second ferromagnetic free layer 178 will rotate into the paper toward saturation, as shown by the arrow 194. When the magnetic moment 194 of the second ferromagnetic free layer is parallel to the magnetic moment 168 of the pinned layer 156, the resistance of the spin valve sensor 130 is minimum. The magnetic moment 190 of the ferromagnetic free layer 176 will rotate in an opposite direction to the magnetic moment 186 of the second ferromagnetic free layer 178, as shown by the arrow 196. In a like manner, with an applied signal into the paper, the magnetic moment 188 of the third ferromagnetic free layer 182 will rotate into the paper toward saturation, as shown by the arrow 198. The magnetic moment 192 of the fourth ferromagnetic free layer 184 will rotate out of the paper, as shown by the arrow 200. Since the magnetic moment 200 of the fourth ferromagnetic free layer is out of the paper, and the magnetic moment 172 of the pinned layer 162 is into the paper, they are antiparallel and the resistance of the spin valve sensor 132 is at a maximum to the sense current. If the field signal from the rotating disk was out of the paper instead of into the paper, the arrows 194, 196, 198 and 200 would be reversed in direction.

Accordingly, when the spin valve read head 52 is subjected to a magnetic field of one polarity, the spin valve sensor 130 will produce a response signal of one polarity and the spin valve sensor 132 will produce a second signal of opposite polarity. The response signals are 180° out of phase with respect to one another and are differentially detected by the differential amplifier 144 which combines the response signals to produce an enhanced response signal free of the noise picked up by the sensors due to common mode noise rejection. The laminated free layers 158 and 164 are described in a commonly assigned U. S. Pat. No. 5,408,377. With the present invention the antiferromagnetic layers 166 and 170 can be constructed of the same material and simultaneously set in their magnetic orientations during fabrication.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. An MR read head with an air bearing surface (ABS), comprising:

first and second spin valve sensors for producing response signals with opposite polarities in reaction to a magnetic field;

a gap layer sandwiched between the first and second spin valve sensors;

first and second leads connected in series to the first spin valve sensor and third and fourth leads connected in series to the second spin valve sensor;

the first and third leads being electrically interconnected;

the first spin valve sensor including a first pinned layer and a first antiferromagnetic layer interfacing one another to form an exchange coupling therebetween and the second spin valve sensor including a second pinned layer and a second antiferromagnetic layer interfacing one another to form an exchange coupling therebetween;

the first and second antiferromagnetic layers pinning magnetic moments of the first and second pinned layers in the same direction;

the first spin valve sensor having a first non-magnetic conductive spacer layer and a first laminated free layer and the second spin valve sensor having a second non-magnetic conductive spacer layer and a second laminated free layer;

the first spacer layer being sandwiched between the first laminated free layer and the first pinned layer and the second spacer layer being sandwiched between the second laminated free layer and the second pinned layer;

the first laminated free layer having a first ruthenium layer sandwiched between first and second ferromagnetic free layers and the second laminated free layer having a second ruthenium layer sandwiched between third and fourth ferromagnetic free layers wherein the first and second ruthenium layers are sufficiently thin so that the first and second ferromagnetic free layers are antiferromagnetically coupled and the third and fourth ferromagnetic free layers are antiferromagnetically coupled;

the second ferromagnetic free layer being thicker and having a greater magnetization than the first ferromagnetic free layer and the third ferromagnetic free layer being thicker and having a greater magnetization than the fourth ferromagnetic free layer so that the first ferromagnetic free layer follows magnetic rotation of the second ferromagnetic free layer and the fourth ferromagnetic free layer follows magnetic rotation of the third ferromagnetic free layer; and the first spacer layer being sandwiched between the first pinned layer and the second ferromagnetic free layer and the second spacer layer is sandwiched between the second pinned layer and the fourth ferromagnetic free layer.

2. An MR read head as claimed in claim 1, wherein the first and second antiferromagnetic layers are substantially the same material with substantially the same blocking temperature.

3. A combined MR read head and inductive write head including the MR read head of claim 2, the combined head comprising:

an inductive coil embedded in an insulation stack;

the insulation stack and the inductive coil being sandwiched between first and second pole pieces; and the first and second pole pieces being spaced by a write gap layer at an air bearing surface.

4. An MR read head as claimed in claim 3, including:

a differential amplifier; and the second and fourth leads connecting the first and second spin valve sensors in parallel across the differential amplifier.

5. An MR read head as claimed in claim 4, including:

first and second sense current sources;

the first sense current source being connected to the second lead and the second sense current source being connected to the fourth lead.

6. A magnetic disk drive including the combined head as claimed in claim 5, the drive comprising:

a frame;

a magnetic disk rotatably supported on the frame;

a support mounted on the frame for supporting the combined head in a transducing relationship with the magnetic disk;

means for rotating the magnetic disk;

positioning means connected to the support for moving the head to multiple positions with respect to said magnetic disk; and means connected to the head, to the means for rotating the magnetic disk and to the positioning means for exchanging signals with the combined head, for controlling movement of the magnetic disk and for controlling the position of the combined head.

7. An MR read head as claimed in claim 2 wherein the magnetic moments of the pinned layers are oriented perpendicular to the ABS and the second and third ferromagnetic free layers have magnetic moments which are oriented in the same direction parallel to the ABS.

8. An MR read head as claimed in claim 2, wherein each ferromagnetic free layer is NiFe.

9. An MR read head as claimed in claim 2, wherein each of the ruthenium layers is 4–10 Å thick.

10. An MR read head as claimed in claim 2, including:

first and second sense current sources;

the first sense current source being connected to the second lead and the second sense current source being connected to the fourth lead.

11. An MR read head as claimed in claim 10, wherein the magnetic moments of the pinned layers are oriented in the same direction and perpendicular to the ABS and the second and third ferromagnetic free layers have magnetic moments which are oriented in the same direction parallel to the ABS.

12. An MR read head as claimed in claim 11, wherein each ferromagnetic free layer is NiFe.

13. An MR read head as claimed in claim 12, wherein each of the ruthenium layers is 4–10 Å thick.

14. A combined MR read head and inductive write head including the MR read head of claim 13, the combined head comprising:

an inductive coil embedded in an insulation stack;

the insulation stack and the inductive coil being sandwiched between first and second pole pieces; and the first and second pole pieces being spaced by a write gap layer at an air bearing surface.

15. An MR read head as claimed in claim 14, including:

a differential amplifier; and the second and fourth leads connecting the first and second spin valve sensors in parallel across the differential amplifier.

16. A magnetic disk drive including the combined head as claimed in claim 15, the drive comprising:

a frame;

a magnetic disk rotatably supported on the frame;

a support mounted on the frame for supporting the combined head in a transducing relationship with the magnetic disk;

means for rotating the magnetic disk;

positioning means connected to the support for moving the head to multiple positions with respect to said magnetic disk; and means connected to the head, to the means for rotating the magnetic disk and to the positioning means for exchanging signals with the combined head, for controlling movement of the magnetic disk and for controlling the position of the combined head.

* * * * *